US008056796B2

(12) United States Patent
Simmons

(10) Patent No.: US 8,056,796 B2

(45) Date of Patent: Nov. 15, 2011

(54) MULTI-ANGLE, ARTICULATED-JIG-SUPPORTED, BEAM-END COMPONENT, MANUAL AND COMPUTER-CONTROLLED WELDING

(75) Inventor: Robert J. Simmons, Hayward, CA (US)

(73) Assignee: ConXtech, Inc., Hayward, CA (US)

( * ) Notice: Subject to any disclaimer, the term of this patent is extended or adjusted under 35 U.S.C. 154(b) by 0 days.

(21) Appl. No.: 12/905,719

(22) Filed: Oct. 15, 2010

(65) Prior Publication Data

US 2011/0031298 A1 Feb. 10, 2011

Related U.S. Application Data

(63) Continuation of application No. 12/156,366, filed on May 30, 2008, now Pat. No. 7,837,084.

(60) Provisional application No. 60/932,488, filed on May 30, 2007.

(51) Int. Cl.
*B23K 37/04* (2006.01)

(52) U.S. Cl. ...................................... 228/44.3; 228/49.1

(58) Field of Classification Search ........................ None
See application file for complete search history.

(56) References Cited

U.S. PATENT DOCUMENTS 3,085,148 A 4/1963 McConnell
3,159,129 A * 12/1964 Lindmark .................... 228/44.3
3,291,321 A 12/1966 Hamilton
3,634,648 A * 1/1972 Morris et al. ............... 219/60 A
3,848,863 A * 11/1974 Owen ............................... 269/9
3,877,129 A 4/1975 Dobson et al.
3,904,845 A * 9/1975 Minkiewicz .................. 228/176
3,918,628 A * 11/1975 Clavey .......................... 228/213
4,014,089 A 3/1977 Sato et al.
4,169,977 A * 10/1979 Pedersen .................... 219/125.1
4,432,486 A * 2/1984 Wascat ......................... 228/49.2
4,483,476 A * 11/1984 Fujikawa et al. .............. 228/4.1
4,653,739 A * 3/1987 Moore ............................ 269/61
4,660,753 A * 4/1987 Kushibe et al. ................. 228/48
5,075,527 A * 12/1991 Ikuma .......................... 219/59.1
5,098,005 A 3/1992 Jack
5,248,078 A 9/1993 Deal et al.
5,673,843 A * 10/1997 Gainey ......................... 228/44.5
5,979,738 A * 11/1999 Kuchuk-Yatsenko et al. . 228/5.7
6,173,881 B1 * 1/2001 Sloan et al. .................... 228/4.1
6,622,906 B1 * 9/2003 Kushibe ........................ 228/212
6,837,016 B2 1/2005 Simmons et al.
6,921,011 B1 7/2005 Mangelsen et al.

(Continued)

FOREIGN PATENT DOCUMENTS

GB 2385817 3/2003

(Continued)

*Primary Examiner* — Kiley Stoner
(74) *Attorney, Agent, or Firm* — Jon M. Dickinson, Esq.

(57) ABSTRACT

Adjustable, elongate, beam-offset jig structure for assisting, under manual, or appropriate computer, control, in welding a pair of beam-end, column-interface components to the opposite ends of an elongate beam. The jig structure includes spaced, adjustable head-stock and tail-stock structures, each capable of holding such a component adjacent a beam end for adjustment to an infinite number of different, pre-weld angular-offset dispositions relative to such a beam end in order to accommodate planned horizontal and vertical beam offsets which will be encountered when such beams are installed in a building frame. A computer-controlled, robotic welder may be provided adjacent each end of the jig structure to implement appropriate welding when any and all offset angles have been jig-established.

5 Claims, 6 Drawing Sheets

W1 W2 24 28a 30 34 36 50 38 32 26 26a 44 78 80 80a 82 28c 84 28b 62 60 63 26b

Figure 1:
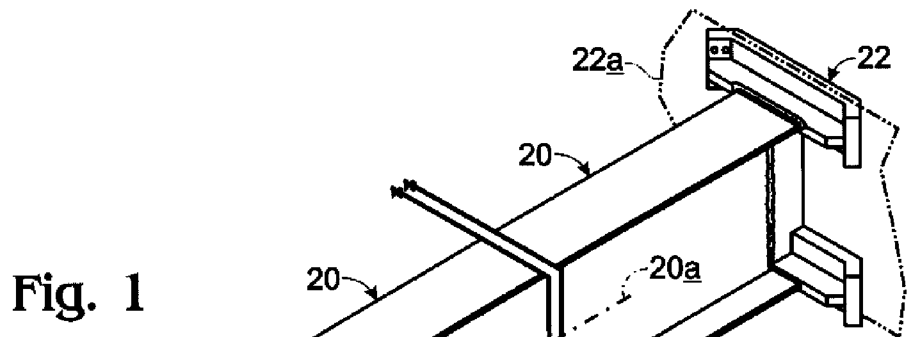

U.S. PATENT DOCUMENTS 6,942,139 B2 * 9/2005 Lipnevicius .................. 228/102
7,051,917 B2 5/2006 Simmons
7,051,918 B2 5/2006 Simmons
7,127,863 B2 10/2006 Simmons
7,716,820 B2 5/2010 Simmons
2002/0005397 A1 1/2002 Bong et al.
2005/0055954 A1 3/2005 Simmons
2006/0163317 A1 * 7/2006 Wirth .............................. 228/32
2008/0245021 A1 * 10/2008 Simmons ........................ 52/633

FOREIGN PATENT DOCUMENTS

JP 61-219481 9/1986

* cited by examiner

W1
W2
22a
22a
72
76
64
64
20
70
74
22
22
20a
24
28c
36
44
32
28b
28a
50
62
60
34
26a
63
26b
26
30

38
48
32
50
52a
58
36
56
51
44
54
46
44,52
45
50
52b
42
40
34
40a
26
30

(a)
20a, 44
(b)
20a,
44
(c)
20a,
44
(d)
20a,
44

24
$W_1$
$W_2$
28a
28b
28c
30
32
34
36
38
50
44
26
26a
26b
60
62
63
78
80
80a
82
84

9
42
36
40
38
50
50
40
40
44, 52
32
34
9

36
42
38
40
86
50
28a
51
46
52
44
44,52
32
45
86

80a
82
20
28c
78
44,
20a
80
84

80a
82
80
20

MULTI-ANGLE, ARTICULATED-JIG-SUPPORTED, BEAM-END COMPONENT, MANUAL AND COMPUTER-CONTROLLED WELDING

CROSS REFERENCE TO RELATED APPLICATIONS

This application is a Divisional Continuation from U.S. Regular patent application Ser. No. 12/156,366, filed May 30, 2008 now U.S. Pat. No. 7,837,084 for "Multi-Angle, Articulated-Jig-Supported, Beam-End Component Welding", which application claims priority to the filing date, May 30, 2007, of U.S. Provisional Patent Application Ser. No. 60/932,488, covering an invention entitled "Multi-Angle-Capable Robotic Beam-End Component Welding". The entire disclosure contents of these prior-filed applications are hereby incorporated herein by reference.

BACKGROUND AND SUMMARY OF THE INVENTION

Recent years have seen significant improvements in the fabrication of components for, and in the assembly of, full-moment nodal connections between columns and beams in a plural-story building frame. An excellent illustration of this progress is found in the disclosure of U.S. Pat. No. 6,837,016. Reference is here made to this U.S. patent for the purpose of providing background information relative to the present invention.

Among the elements of building-frame component and assembly progress which are represented by the disclosure content of that U.S. patent are that components which enable the creation of robust, full-moment nodal connections between columns and beams may be fabricated under factory and computer-controlled precision conditions for the preassembly of column and beam components which may then be put together on a jobsite quickly, accurately, with immediate, full-moment stability as components are gravity-locked in place without any additional hardware required, and all done in significantly safety-improved conditions which avoid subjecting steel workers to major, long-time, high-level injury exposure.

As those skilled in the building art know, there are various kinds of building frames which not only benefit from the kinds of improvements reflected in the mentioned U.S. patent, but also frames which introduce certain complexities with respect to nodal connections that must be brought into being between beams and columns where so-called vertical and/or horizontal design offsets need to be addressed. For example, a vertical offset is typified by a building frame which is designed to support a parking structure having multiple, sloping floors connected by sloping vehicle ramps, wherein various beams that extend between next-adjacent columns must be inclined rather than horizontal. A horizontal offset is one which, for example, results when the grid pattern for a layout of columns is other than orthogonal, at least in certain regions of a building frame. Such a horizontal offset may be one wherein next-adjacent columns that reflect an offset are positioned with their "confronting faces" parallel to one another but not directly facing one another, or one wherein a polar grid pattern is utilized to deal, for example, with a curved outside building surface.

Where one or both of these kinds of offsets exists, singular or compound, it is of course necessary to accommodate these offsets by introducing appropriate angular adjustments near the ends of the beams where they connect with columns, so that appropriate full-moment connections can be confidently established. Angular adjustments required to deal with typical vertical offsets lie in the range of about ±8° (relative to the horizontal) in a vertical plane. Angular adjustments needed to accommodate horizontal offsets typically lie in the same range of about ±8° in a horizontal plane. Compound offsets (combined vertical and horizontal) may, of course, be characterized by angular-adjustment needs formed by any combination of these two "singular-character" offsets.

In this kind of a situation, it is, of course, highly desirable to be able easily and relatively inexpensively to accommodate such offsets and such angular construction considerations while at the same time utilizing the various advantages which have been offered to the industry by advances like those which are expressed in the above-referred-to U.S. patent.

The present invention takes square aim at this situation by proposing a unique, plural-axis, articulated jig structure, also referred to as a beam-offset jig structure, and related methodology, which accommodate manual, or in some instances more preferably computer-controlled robotic, welding of beam-end column-interface components, also called beam-end components and beam-end connecting components, to the opposite ends of beams intended to be locked into a building frame between next-adjacent columns through full-moment connections, regardless of whether or not vertical, horizontal or both kinds, if any, of the types of offsets mentioned above are involved. A preferred and best-mode embodiment, and manner of practicing, the present invention, are specifically illustrated and described herein in the context of computer-controlled robotic welding which, it will be apparent, is simply an automated, and perhaps more speedy, version of manually-implemented welding. The welding end results, whether achieved manually, or with computer-driven assistance, are essentially the same.

It should be understood at this point that the jig-structure (and associated methodology) features of the present invention, which features are illustrated herein in conjunction with a specific type of representative, full-moment, nodal-connection componentry, is not per se linked to the geometry of that componentry. Rather, the structure and methodology of the present invention, as proposed herein, are simply representatively illustrated in this disclosure, in relation to such a particular kind of nodal-connection componentry, in the realm of including complementary receiving structure that allows such componentry, i.e., its particular configuration, to be handled easily during the process of weld attachment to the opposite ends of a beam, with the full recognition that similar complementary accommodating structures could just as well be employed to deal with other specific geometries of nodal-connection hardware.

All of the central features of the invention which one of skill in the art needs to understand in order to practice the invention are fully and clearly disclosable in high-level schematic and stylized drawings, and that is precisely the lead-in approach to disclosure of this invention which is employed below in the detailed description of the invention. Beyond the fully informative schematic drawings, more detailed component drawings are provided simply to illustrate a specific design approach which has been chosen to implement the handling of one illustrative type of beam-end column-interface component (nodal-connection hardware) recently developed as part of a newly proposed, full-moment, beam-column nodal connection. This just-mentioned, newly proposed nodal connection is illustrated and described in currently co-pending U.S. Patent Application Publication No. US2008-0295443-A1, filed May 30, 2008, for "Halo/Spider, Full-Moment, Column/Beam Connection in a Building Frame".

Reference is here made to this co-pending application for more detailed information regarding this particular kind of nodal connection.

Accordingly, proposed by the present invention, in its preferred form, is a unique, elongate jig structure of the type suggested above, which features an elongate, generally horizontal frame that defines a bed for receiving a pair of longitudinally spaced head-stock and tail-stock structures. Each of these structures may either be directly employed for readily performable manual operation and welding, or may be equipped with a conventional, plural-axis (such as a six-axis), computer-controlled, robotic welder disposed in the relevant head-stock or tail-stock structure immediately adjacent appropriately designed angulation and pivot structure (articulation structure, or motion structure). Such motion structure, which is employable in all embodiments of the invention—manual or computer-associated—is adjustable, in accordance with the features of the invention, to produce proper relative angular positioning between the opposite ends of an elongate beam, such as an I-beam, and a pair of opposite, beam-end column-interface components which are to be employed ultimately in connecting a beam between a pair of columns to produce full-moment connections with those columns. Such beam-end column-interface components can be visualized as each possessing a nominal plane, and the angular positioning which takes place in the practice of the present invention is referred to herein as occurring between such a nominal plane and the long axis of a beam. In the proposed jig structure, the head-stock is equipped, at least in part, with motor-drive equipment to effect certain motion, such as rotation, of certain componentry, with the tail-stock, while having similar, overall motion structure, operating as a slave unit, as will shortly be explained.

The apparatus of the invention is fully capable of dealing not only with conventional, "squared-off", "non-angular" alignment and pre-positioning between the long axis of a beam and the nominal planes of a pair of beam-end connecting components, where no horizontal or vertical offset needs to be accounted for, but also with infinite (within a range), pre-welding angular alignment and pre-positioning of beam-end components relative to a beam to deal with one or both kinds of offsets, singularly or in combination. In most instances, the jig structure, if equipped to accommodate angular beam-end connecting-component adjustments in the range of about ±8° for each kind of offset, will adequately handle all typical offset conditions. The jig structure illustrated herein is so equipped.

Thus, and as will be seen from the detailed description of the invention which appears below, the mentioned head-stock and tail-stock structures each includes (a) a main rotator which is capable of rotating on what is referred to herein as the principal long axis of the jig structure of the invention, which axis is also called both the jig-rotation axis and simply the rotation axis, (b) a rocker, or rocker structure, which is carried on that rotator and which allows for limited, reversible, angular rocking about a rocker axis which is orthogonal to, and which intersects, the jig-rotation axis, and (c), what is referred to herein as a beam-end, column-interface-component gripper which is mounted on the rocker for independent 360° rotation about a rocker-rotation axis that intersects the rocker axis orthogonally at the location where the rocker axis intersects the jig-rotation axis.

This unique arrangement of componentry allows for appropriate, compound angular adjustment, if such is necessary, effectively in an infinite adjustability way to accommodate all arrangements of angular disposition which are normally expected may be required between the long axis of a beam and the nominal plane of a beam-end column-interface component in order to accommodate not only "squared-off" ultimate disposition of that beam, but also angular offset disposition as desired.

Within the apparatus of the invention, and as was stated more generally above, the gripper just mentioned is one which, while illustrated herein specifically shaped to deal with one illustrative kind of beam-end column-interface component, will of course be configured, as necessary, to deal with whatever particular-geometry beam-end component may be the kind which is intended to be joined by welding to the end of a beam.

The above-mentioned features and advantages presented and offered by the jig structure of the present invention will become more fully apparent as the detailed description thereof which shortly follows is read in conjunction with the accompanying drawings.

DESCRIPTIONS OF THE DRAWINGS

FIG. 1 is perspective view of an elongate I-beam whose opposite ends are fitted with a particular style of beam-end, column-interface component. In this figure, the beam-end, column-interface components are shown in what is referred to as being a square-fitted condition relative to the illustrated beam, that is, with the nominal planes of these beam-end components disposed substantially normal to the long-axis of the illustrated beam.

Figure 2:
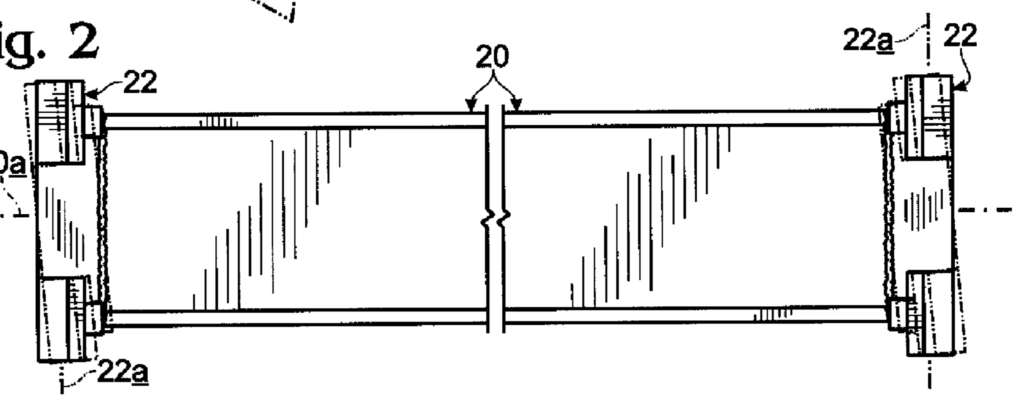

FIG. 2 is a lateral elevation of the beam and beam-end components shown in FIG. 1. In this view, the two beam-end components are shown in solid lines in what was just mentioned as being their square-fitted conditions, and they are also shown in dash-double-dot lines in commonly counterclockwise-angulated dispositions relative to the long axis of the beam. These angulated dispositions are designed to accommodate what has been described earlier herein as a vertical offset in a building frame.

Figure 3:
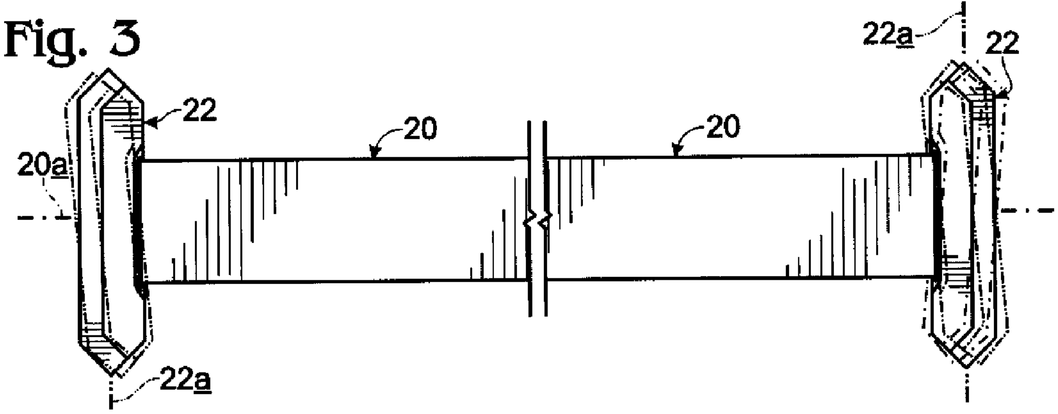

FIG. 3 is a downward-looking plan view of the beam and of the beam-end components of FIG. 1. Here, the beam is illustrated with its two, connected beam-end components shown in solid lines in their square-fitted conditions, in dash-double-dot lines in commonly counterclockwise-angulated conditions suitable for dealing with a non-polar, non-orthogonal column pattern requiring a horizontal offset, and in a combination of dash-double-dot (left side) and dash-dot (right side) lines in another set of angulated conditions suitable for dealing with a horizontal offset associated with a polar-grid arrangement of columns.

Figure 4:
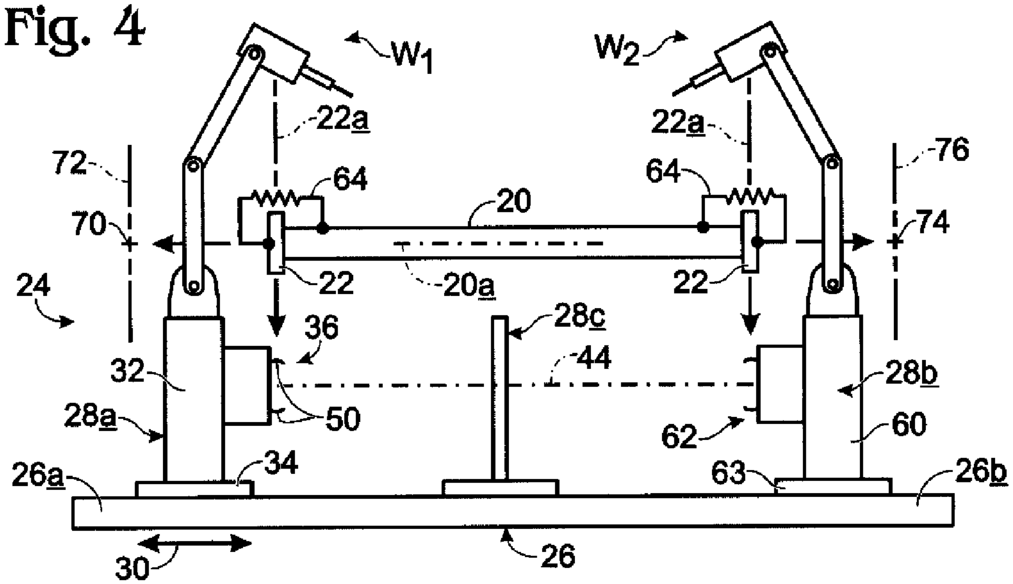

FIG. 4 is a simplified, high-level, schematic elevation illustrating the overall arrangement of a beam-offset jig structure constructed in accordance with a preferred and best-mode embodiment of the present invention. In this view, an I-beam is shown which has been prepared to be lowered into a seated and supported condition in the jig structure of the invention, preparatory to having a pair of beam-end, column-interface components, appropriately adjusted angularly relative to the long axis of the beam—thereafter to be welded to the beam. In this view, the beam is shown with two beam-end components preliminarily and temporarily linked to its opposite ends under pressure furnished by removable tension-spring clips of suitable design which will eventually be removed. These spring clips form no part of the present invention.

Figure 5:
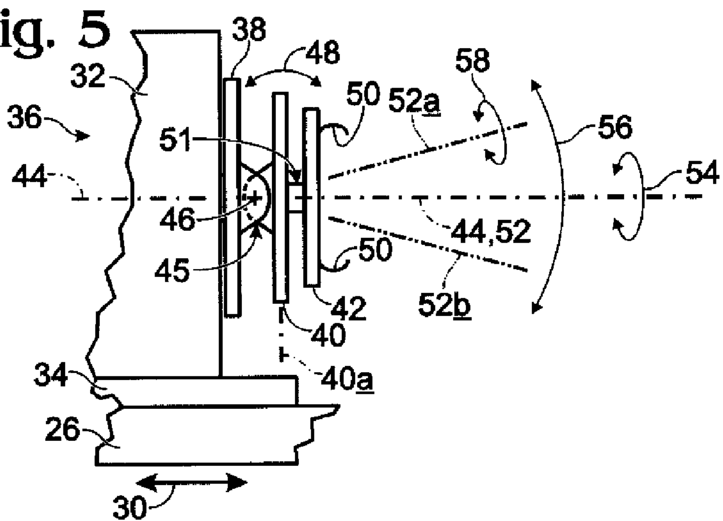

FIG. 5 is a larger-scale, simplified, high-level schematic view illustrating angular articulation structure which appears at the left-hand side of FIG. 4 in a head-stock structure that forms part of the jig structure of the invention. This schematic view fully illustrates all of the angulation articulation capabilities of the jig structure of the invention.

Figure 6:
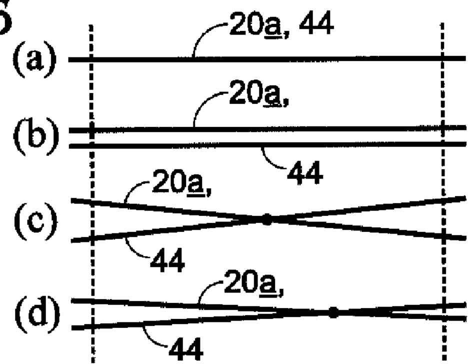

FIG. 6 includes four parts (a), (b), (c) and (d) which schematically illustrate, nonexclusively, several, different, spatial relationships which may exist individually between the long axis of a beam and the above-mentioned jig-rotation axis during different beam-end-component-to-beam welding operations. The straight lines in this figure variously represent these axes.

FIGS. 7-11, inclusive, are even larger-scale and more detailed, representational drawings illustrating, generally, one specific set of components which have been made to implement the jig structure shown in FIGS. 4 and 5.

DETAILED DESCRIPTION OF THE INVENTION

Turning now to the drawings and referring first of all to FIGS. 1-6, inclusive, FIGS. 1, 2 and 3 illustrate an elongate I-beam 20 having a long axis 20*a*, and a pair of particular-style, beam-end column-interface components 22 welded in place to the opposite ends of the beam. Beam-end components 22 each possesses what is referred to herein as a nominal plane, shown at 22*a*. In FIGS. 1-3, inclusive, the two beam-end components are shown in solid lines square-fitted to the opposite ends of beam 20. As a consequence, nominal planes 22*a* are illustrated in conditions disposed substantially normal to beam long axis 20*a*.

Digressing here for a moment, and as was mentioned earlier herein, no aspect of the present invention is specifically concerned with the particular design of a beam-end component which is to be welded to the end of a beam. Notwithstanding this statement, the particular beam-end components which are illustrated in FIGS. 1-3, inclusive, are of a category which is designed, with appropriate hardware attached to the sides of a column, to establish gravity-seat-and-lock, full-moment connections simply through the process of lowering a beam-end-component-equipped-beam vertically downwardly into a prepared receiving space between a pair of next-adjacent columns. The beam-end components specifically illustrated are formed, on their laterally opposite sides, with male-tapered bearing surfaces which seat by gravity complementarily into receiving sockets which are defined by female-tapered bearing surfaces that are included in structures which are anchored at appropriate common elevations to the corners of next-adjacent columns in a steel building frame structure.

As will become apparent, and as should be well understood, appropriate gripper structure, soon to be described in the jig structure of the present invention, has been made so as to replicate the just-mentioned female receiving socket structure which is expected to be made present adjacent the sides of a column to which the beam of FIGS. 1, 2 and 3 is ultimately to be connected. Such an arrangement thus equips the jig structure of this invention to receive and support a beam with the appropriate beam-end components during the process of making appropriate angular adjustments in the beam-end components relative to a beam's long axis prior to welding in place.

While, as has just been stressed, there is no part of the present invention which is linked specifically to any particular beam-end-component design, the design specifically illustrated in FIGS. 1-3, inclusive, is, as stated earlier herein, fully described in the above-mentioned, currently co-pending U.S. Patent Application, Publication No. US2008-0295443-A1. Accordingly, reference may be made to that pending patent application for a further elaboration regarding the relevant beam-end component structure.

As was mentioned above in conjunction with descriptions given so far for FIGS. 1-3, inclusive, in the drawings, in each of these three drawing figures, beam-end components 22 are shown in solid lines in their square-fitted conditions. These square-fitted conditions are conditions which result from the beam-end components being welded to the ends of beam 20 with their nominal planes disposed substantially normal to the long axis 20*a* in the beam.

As was also mentioned earlier, in FIG. 2, in dash-double-dot lines, beam-end components 22 are shown commonly angulated in a counterclockwise manner relative to their solid-line positions. Specifically, they are here shown rotated at a common angle in order to accommodate what has been referred to earlier herein as a vertical offset in a building frame.

In dash-double-dot lines in FIG. 3, the beam-end components are shown in commonly counterclockwise-rotated angular dispositions relative to beam long axis 20*a*—suitable for dealing with a simple lateral offset in a non-orthogonal column pattern in a building frame. In a combination of dash-dot (right side) and dash-double-dot (left side) lines in FIG. 3, the beam-end components are shown counter-angulated relative to beam long-axis 20*a*, i.e., in reverse directions, so-to-speak, in order to accommodate a horizontal offset of the type experienced in a column grid pattern which is polar.

The jig structure of the present invention, now shortly to be described in detail, is designed with great versatility to receive and support a beam and a pair of beam-end components, prior to welding, in conditions establishing the appropriate angulations required between a beam's long axis and the beam-end components' nominal planes in order to accommodate one or both (singularly or in combination) type(s) of the beam offsets mentioned above.

In terms of establishing proper confronting surfaces to perform welding under angulated conditions, there are principally two approaches which one might choose to use. One approach involves crosscutting the ends of a beam in planes that are pre-angulated so as to parallel the after-welding nominal planes of attached beam-end components, and to do this in such a fashion that such beam-end components end up being attached by welding to the beam at the appropriate angles to suit a particular kind of offset. Another approach involves leaving the opposite ends of a beam crosscut in squared-off conditions, with the jig structure of the invention being employed then to define the proper angular dispositions for beam end components, and with resulting, modest, angular gaps existing between each beam-end component and the squared-off end of a beam, which gaps will be filled appropriately during welding. Which one of these approaches to use is entirely up to the discretion of the person invoking the practice of the present invention, and both approaches are readily accommodated by the jig structure of the invention.

Focusing attention now particularly on FIGS. 4-6, inclusive, indicated generally at 24 is a preferred and best-mode embodiment of the beam-offset jig structure of the present invention. As was mentioned earlier herein, the illustration of jig structure 24 in FIGS. 4 and 5 is presented in a very high-level, schematic fashion in order to convey an understanding quickly and easily about the components which make up this jig structure. Another reason for employing such high-level, schematic views is that the specific details of construction of the various components of jig structure 24 do not particularly form any part of the present invention. Put another way, one skilled in the art, after reading the schematic description of the invention herein alone, will be fully equipped to build and operate the jig structure of the invention by adapting its components to specific beam-end componentry which may be involved in a particular application. FIGS. 7-11 herein, still to be described, are non-schematic, and rather picture one representational rendering of the jig structure of the invention. These figures point out one way of implementing the invention in a more specific fashion.

Jig structure 24 includes an elongate frame 26 having opposite ends 26*a*, 26*b*. End 26*a* will be referred to herein as the head end of frame 26, and end 26*b* as the tail end of the frame.

Mounted on frame 26, as will shortly be more fully described, is what is referred to herein as beam-support structure 28 which takes the form of a head-stock structure 28*a*, a tail-stock structure 28*b*, and an adjustable, central, beam-support yoke structure 28*c*. Head-stock structure 28*a* is appropriately supported on frame 26, adjacent frame end 20*a*, for selective, reversible travel back and forth along frame 26, as is generally indicated by double-headed linear arrow 30 in FIG. 4. Motion, as indicated by arrow 30, may be effected by a suitable drive motor and gear arrangement (not shown) which operates between frame 26 and head-stock structure 28*a*. The purpose for this back and forth movability of the head-stock on the jig apparatus frame is to accommodate use of the jig structure in conjunction with beams having different lengths.

Previously mentioned beam 20 is shown disposed overhead jig structure 24 in a condition poised to be lowered into the jig structure for beam-end-component adjustment and welding. More will be said about this poised condition of beam 20 shortly.

Included in head-stock structure 28*a* are a head-stock frame 32 which is mounted on a sled 34 which in turn is mounted for reversible translation, as indicated by arrow 30, on frame 26. Carried on head-stock frame 32 is articulation structure 36 which is constructed in accordance with the present invention, and which includes a rotator 38, a rocker 40, and a gripper 42.

Rotator 38 is suitably journaled on head-stock frame 32 for reversible, 360° rotation, under non-illustrated drive-motor control, about an axis 44 which is referred to herein both as a rotator axis, and as a jig-rotation axis. Rotator axis 44 is considered herein to be the main articulation/rotation axis which is provided in jig structure 24.

Rotator 38 may typically take the form of a generally circular, vertical plate which, while fully rotatable as just described, is also appropriately equipped to be locked selectively against rotation at four, different, orthogonally-related positions which are relevant to a beam-end component welding operation, as will shortly be described.

Rocker 40 takes the form of any suitably shaped, generally planar plate, which is pivoted through suitable pivot structure 45 on rotator 38 for limited (about ±8°) angular rocking about what is referred to herein as a rocker axis 46. The nominal plane of rocker 40 is shown at 40*a*. Axis 46, which extends normally into the plane of FIG. 5, is orthogonal with respect to rotator axis 44. Axis 46 rotates in a vertical plane in space with rotation of rotator 38.

Rocking action of rocker 40 is generally illustrated in FIG. 5 by double-headed, curved arrow 48. In the particular embodiment of jig structure 24 which is now being described, appropriate, reverse-direction limit structure (not shown in FIG. 5) is interposed rotator 38 and rocker 40 so as to limit the possible reversible rocking range of rocker 40 about axis 46 to about ±8° (as mentioned earlier) relative to the solid-line position shown for the rocker in FIG. 5. Rocking of rocker 40 to a particular angular rotation relative to the rotator is accomplished in structure 24 manually, as will shortly be explained, but could also just as well be performed under appropriate motor-drive control, if desired.

Gripper 42, which includes appropriate gripping structure, such as that generally illustrated by curved lines 50 in FIGS. 4 and 5, is rotatably mounted at 51 on rocker 48 for rotation about what is referred to herein as a rocker-rotation axis 52. Axis 52 herein is disposed substantially normal to the nominal plane 40*a* of rocker 40, and this rocker rotation axis, as seen nominally in FIG. 5, coincides with rotator axis 44 under circumstances with the components of articulation structure 36 shown in their solid-line dispositions in FIG. 5. Rocker-rotation axis 52 intersects rocker axis 46 orthogonally at the very location where axis 46 orthogonally intersects rotator axis 44.

In dash-double-dot lines 52*a* and 52*b* in FIG. 5, rocker rotation axis 52 is shown in two different angulated dispositions which have resulted, respectively, from limited-angle, counterclockwise and clockwise rocking of rocker 42 through a range of about ±8°. Under all circumstances, the rocker-rotation axis retains the conditions of "other-axes" intersections as were just described.

Toward the right side of FIG. 5, three double-headed, curved arrows 54, 56, 58 illustrate different articulation motions. Arrow 54 represents reversible 360° rotation of rotator 38, and all of the structure which it carries, about jig-rotation axis 44. Arrow 56 represents reversible, limited-angle (about ±8°) rocking of rocker 40, and all of the componentry which it carries, about rocker axis 46. Arrow 58 represents reversible 360°-possible rotation of gripper 42 about rocker-rotation axis 52.

Although shown only very schematically in FIGS. 4 and 5, gripper structure 50 which is provided on gripper 42 is designed to receive a beam-end component 22 in the same fashion, essentially, that such a component will be received adjacent the side of a beam in an intended full-moment nodal connection. Accordingly, and as was mentioned earlier herein, this beam-end-component-receiving gripper structure will always be appropriately designed, by one employing the jig apparatus of the present invention, to be suitably configured to receive whatever form of beam-end component is being attached to the end of a beam.

What will be very evident from the description of the structure of the invention which has been presented so far (with respect to FIGS. 4 and 5) is that articulation structure 30, with motion therein and thereby permitted about the relevant articulation axes which have just been described, is fully capable of angulating a received and gripped beam-end component relative to the long axis of a beam to which it is to be welded, to any angular condition within the range of angles mentioned herein, suitable for preparing the associated end of a beam to be attached to a column in a manner which will accurately accommodate any one or combination of the offsets earlier described herein.

Included in tail-stock structure 28*b* are a tail-stock frame 60 which is like previously mentioned head-stock frame 32, and articulation structure 62 which is essentially duplicative of just-described articulation structure 36. Frame 60 is mounted on a platform 63 which is anchored to jig-structure frame 26 adjacent frame end 26*b*. Articulation structure 62 includes a rotator, a rocker, and a gripper (not specifically pictured in FIGS. 4 and 5) which are like previously described rotator 38, rocker 40, and gripper 42, respectively. The articulation components in articulation structure 62 essentially face those same like components in articulation structure 36, with the rotator in structure 62 being designed also to rotate on jig-rotation axis 44. Within articulation structure 62, there are included rocker- and rocker-rotation axes which are counterparts to axes 46, 52, respectively, described in relation to articulation structure 36.

Figure 10:
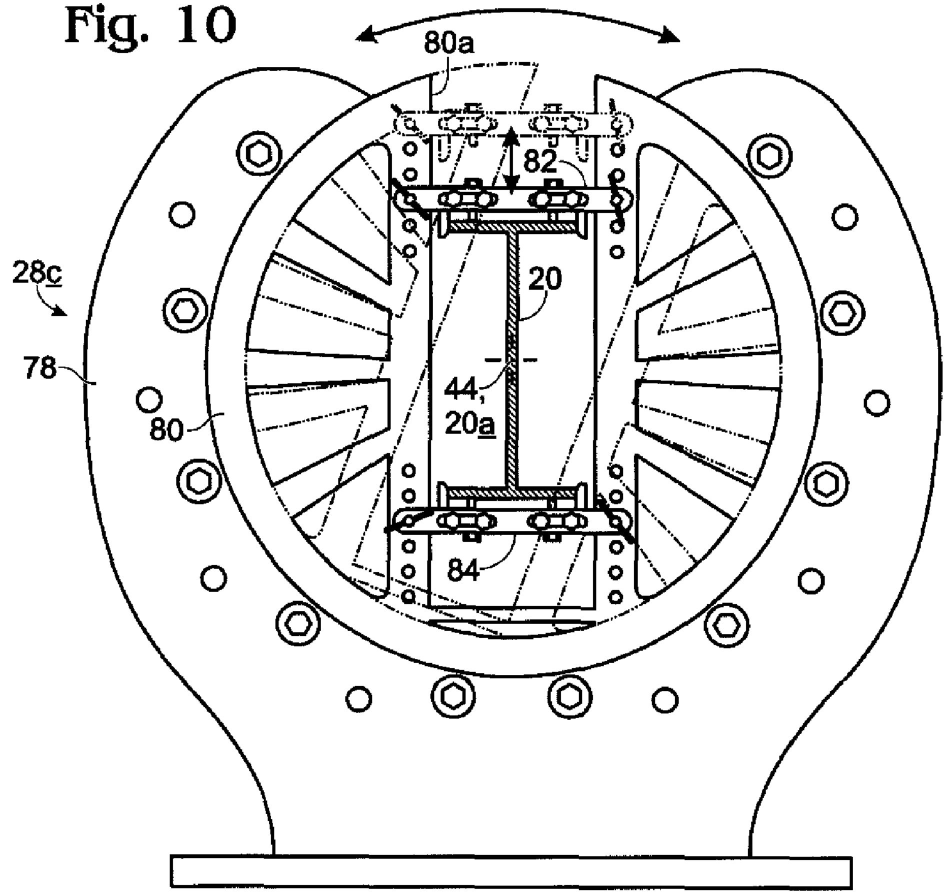
Figure 11:
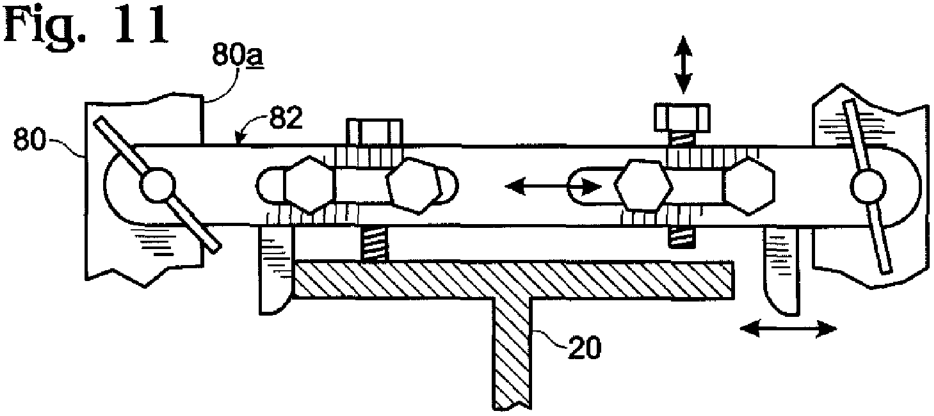

Yoke structure 28*c*, a particular, representational rendering of which is seen in FIGS. 10 and 11 (not yet discussed) is provided generally centrally between head-stock structure 28*a* and tail-stock structure 28*b* for releasably clamping, via yoke-provided clamping structure, onto the length mid-region of a beam 20 supported in jig structure 24. The yoke structure may be adapted to be shiftable in position, as desired, along frame 26 between structure 28*a*, 28*b*, and is equipped with a beam-receiving, slave-rotor plate which can rotate on axis 44 during rotation of a beam about its long axis in the context of weld-attaching of a pair of beam-end components to that beam.

Finally with regard to structure which is pictured in FIG. 4, indicated generally at $W_1$ and $W_2$, suitably attached to, or near, head-stock frame 32 and tail-stock frame 60, respectively, are two, conventional, computer-controllable, multi-axis robotic welders which may be employed, in a non-manual practice of the present invention, to perform computer-controlled welding of beam-end components 22 to the ends of I-beams, such as I-beam 20. In a purely manual-operation setting, such robotic welders are not employed.

As was mentioned earlier herein, shown poised above jig structure 24 in FIG. 4 is a beam 20 which has been readied for lowering and seating into jig structure 24 for the purpose of adjusting, and then weld-attaching, two beam-end components 22 to the opposite ends of the beam. The condition of beam 20, as such is shown schematically in FIG. 4, is that its opposite ends are square-cut in accordance with one of the two earlier-mentioned approaches typically to be followed in terms of preparing a beam and a pair of end components for weld attachment.

Accordingly, the two, illustrated (in FIG. 4) beam-end components 22 are seated in square-fitted conditions, temporarily in place adjacent the opposite ends of beam 20, and are held there by appropriately configured tension spring-clip devices 64 which have only been shown symbolically in FIG. 4. The intention of these spring-clip devices, is to provide a way, initially, to support a beam-end component in a "nominally" correct condition against the end of a beam, with that beam-end component pressed against the beam, but permitted to be adjusted against spring-biasing resistance, as will shortly be explained, preparatory to performing a beam-end-component-to-beam welding operation. The specific design of such a spring-clip device is well within the skill level of those generally skilled in the art, and will depend, of course, upon the specific nature of a beam-end component which is involved. The spring-clip component, will, with proper design, be one which is easily detachable when it is no longer needed, and which will in no way interfere with lowering and seating of a beam with its temporarily attached beam-end components, as seen in FIG. 4, into the gripper structures in the articulation structures in jig structure 24.

Specifically with respect to relative motion between a beam-end component and a beam which is permitted by spring-clip structures 64, these spring-clip structures accommodate a modest amount of axial translation of a beam-end component relative to its associated beam-end, as is generally indicated by reverse-direction arrows 66, 68, and also permit angulation of associated beam-end components freely about two, orthogonally disposed axes, such as axes 70, 72 shown adjacent the left side of FIG. 4, and axes 74, 76 shown adjacent the right side of FIG. 4.

Axes 70, 74, extend normally into the plane of FIG. 4. Axes 72, 76, are vertical axes which are orthogonal with respect to axes 70, 74, respectively, and lie within the plane of FIG. 4. It will be understood that axes 70, 72, 74, 76, pictured adjacent opposite ends of beam 20 in FIG. 4, and with respect to a frame of reference which involves the long axis 20*a* of beam 20, are orthogonal in each case to axis 20*a*. It is about axes 70, 72, 74, 76 that manipulation and operation of the articulation structures in jig structure 24 make adjustments in beam-end components to dispose them properly for weld attachment to the opposite ends of a beam 20.

While it will become apparent to those skilled in the art that there are many ways to employ jig structure 24 specifically in a set of procedural steps to accommodate beam-end-component welding, one preferred manner of implementing these steps will now be described.

With a beam poised, as illustrated in FIG. 4, for "insertion" into the gripper structures in jig structure 24, and describing the approach involving beginning with beam-ends square-cut, articulation structures 38, 62, are adjusted so as to enable the gripper structures therein to receive by gravity-lowering, and to allow the seating of, the opposite-end beam-end components as a beam 20 is lowered into place in the jig structure. When beam-seating has taken place in the gripper structures, appropriate releasable anchoring of the spring-clip-attached beam-end components in the gripper structures is performed. As will be seen representatively in relation to other drawing figures herein still to be described, regarding the particular design of beam-end components 22 which are pictured in those other drawings, threaded bolts are employed to accomplish such anchoring.

Lowering of beam 20, as just generally described, causes the central portion of the beam, and in most instances the exact longitudinal center of the beam, to settle into previously described yoke structure 28*c*. Eventually, and as will shortly be explained, the central portion of a beam received in yoke structure 28*c* will be releasably clamped therein for beam-central stabilization in the yoke structure during a welding operation. Just where along frame 26 this yoke structure is located will depend, to some extent, upon the manner in which it is expected that the long axis of a received beam 20 will be disposed in space relative to rotator axis 44.

FIG. 6 in the drawings illustrates non-exclusively at (a), (b), (c) and (d) four, different, representative spatial relationships which may exist between these two axes, such a relationship ultimately depending upon what kinds of angular adjustments need to be implemented between a beam's long axis and end components 22. Illustration (a) represents a situation wherein a beam's long axis and axis 44 exactly coincide with one another. This is a condition which will regularly occur if no angular adjustment is required between the nominal plane of a beam-end component and the long axis of a beam. Illustration (b) shows a situation in which a beam's long axis 20*a* and rotator axis 44 are spaced from, but parallel to, one another. Illustration (c) represent a spatial orientation of these two axes wherein they intersect one another substantially centrally between the positions of the head-stock and the tail-stock, which positions are represented in FIG. 6 by two, laterally spaced, vertically disposed lines. Illustration (d) represents a situation which is similar to that shown in illustration (c), except that the point of intersection of the two mentioned axes is displaced to one side of the central point between the head-stock and the tail-stock.

Once a beam with its spring-clip-attached end components has been settled into jig structure 24, the articulation structures in the head-stock and the tail-stock structures are maneuvered, such as manually maneuvered, to angulate the nominal planes of the associated beam-end components so as to deal with a particular, pre-known type of building-frame offset which is to exist between a pair of next-adjacent columns. The spring-clips allow such adjustments to be made under spring tension, while, at all times, continuing to stabilize the beam-end components in appropriate contact adjacency with the opposite ends of a beam 20.

When proper angulation has been accomplished, tack welds are applied at appropriate locations between the beam ends and the now-angulated, beam-end components so as to enable removal of the spring-clips from further use.

When angulation as just described has taken place, at this point in time, the location in the region of yoke structure 28*c* through which beam axis 20*a* passes is established, and the yoke-included clamping structure, mentioned above, is adjusted so as to clamp onto the faces and edges in the flanges in the relevant beam, thus to stabilize the longitudinal central region of the beam during the about-to-be-performed, full-welding operation.

When all of these steps have been performed, the drive motor which is provided for rotating rotator 38 in head-stock structure 36, is operated to place the beam and its associated beam-end components in, successively, four, different, orthogonally-related, temporarily-fixed dispositions, wherein the major, to-be-welded edge-lines of contact (or near contact because of angulation) in existence between the beam-end components and the beam ends will lie in horizontal planes appropriate to accommodate full welding.

In each of these four orthogonal positions, welding takes place, in a computer-based implementation of the invention, under computer control operating the two robotic welders which have been shown in the drawing figures described so far herein at $W_1$ and $W_2$. When welds have been produced, either manually or under computer-robotic control, in all four of the mentioned orthogonal rotated conditions for a beam, that beam, and its now fully weld-attached beam-end components is essentially finished and is appropriately removed from jig structure 24.

Proper angular adjustment of the beam-end components relative to a supported beam, and proper orthogonal fixed-positioning of a beam and associated beam-end components about rotator axis 44 as just mentioned, is stabilized through appropriate affixing hardware which is operable, effectively, to lock the angulation-structure components, and rotator 38, in their respective, adjusted-to conditions. The details of this positional locking structure do not form any part of the present invention, and accordingly are not specifically illustrated and described herein, though they are illustrated appropriately in FIGS. 7-11, inclusive.

As was mentioned earlier herein, FIGS. 7-11, inclusive, are representational drawings illustrating one very specific way in which jig structure 24 has been constructed to handle beam-end components and nodal connections like those described in the above-referred-to, copending U.S. patent application. In these several figures, in addition to additional labeling of several further-discussed components which are particularly labeled only in these figures, components, and other drawing-illustration elements, which appear, and which are directly related to what has been shown already schematically in FIGS. 4 and 5, are similarly labeled.

Figure 7:
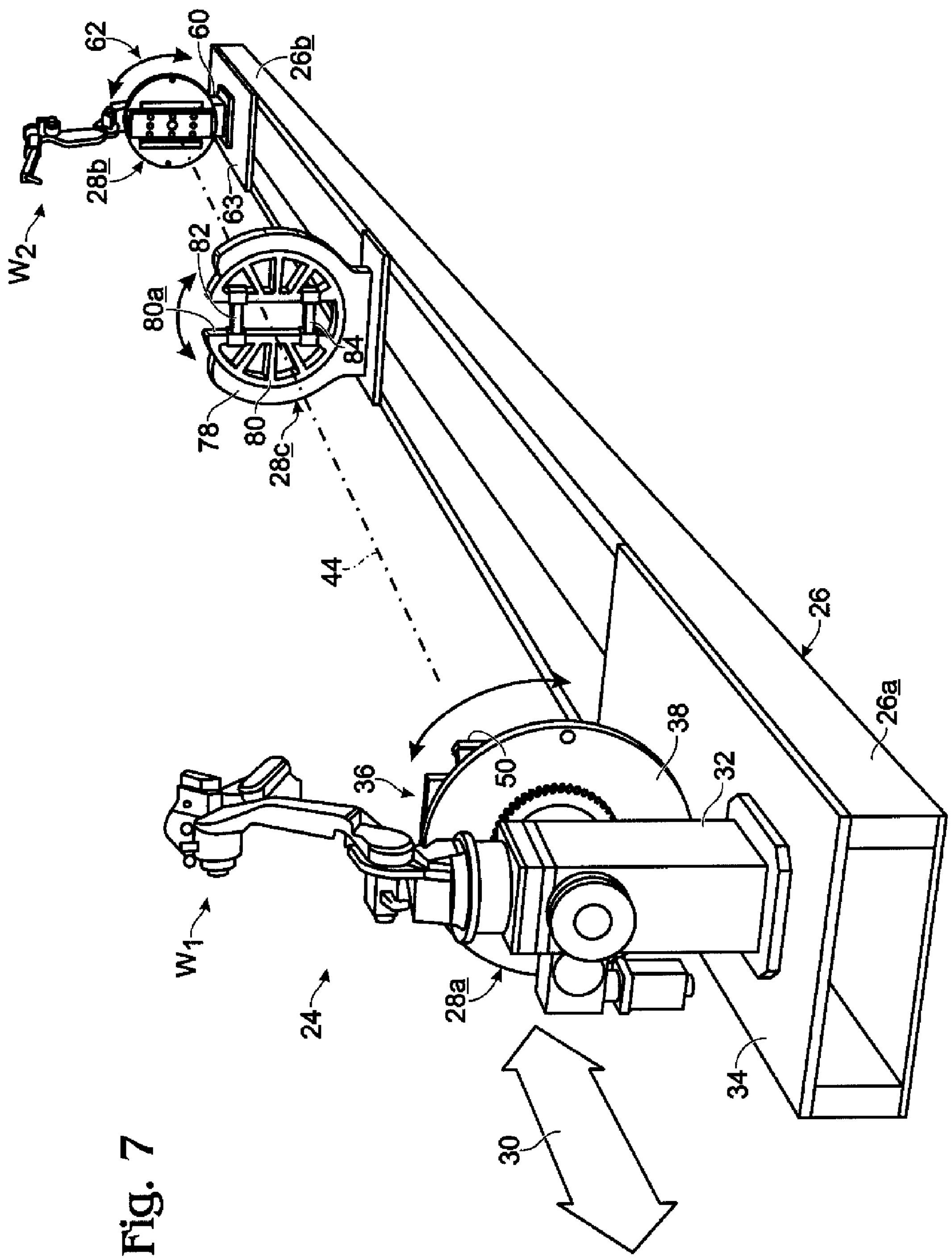

FIG. 7 provides a perspective illustration essentially of the same organization of components which is shown schematically in FIG. 4. Yoke structure 28*c* can be seen to include a yoke 78, and rotatably supported in yoke 78, a generally circular slave rotor plate 80 which includes a deep and wide, nearly full-diametral, central slot 80*a* which is specifically adapted to receive the longitudinal central portion of a beam 20 (not shown in FIG. 7). Two crossbars, which are shown at 82, 84 in FIG. 7, span the width of slot 80*a*, are adjustable, selectively and independently, vertically in FIG. 7 within slot 80*a*, and carry, as will shortly be seen in two other drawing figures, screw-adjustable clamping instrumentalities which form the previously mentioned yoke clamping structure, and which are employed to clamp against the faces and lateral edges of the two flanges present in a yoke-received I-beam 20. The two other drawing figures which more specifically show details of construction of the particular form of yoke structure 28*c* which is pictured herein are FIGS. 10 and 11. More will be said about these two figures very shortly.

Figure 8:
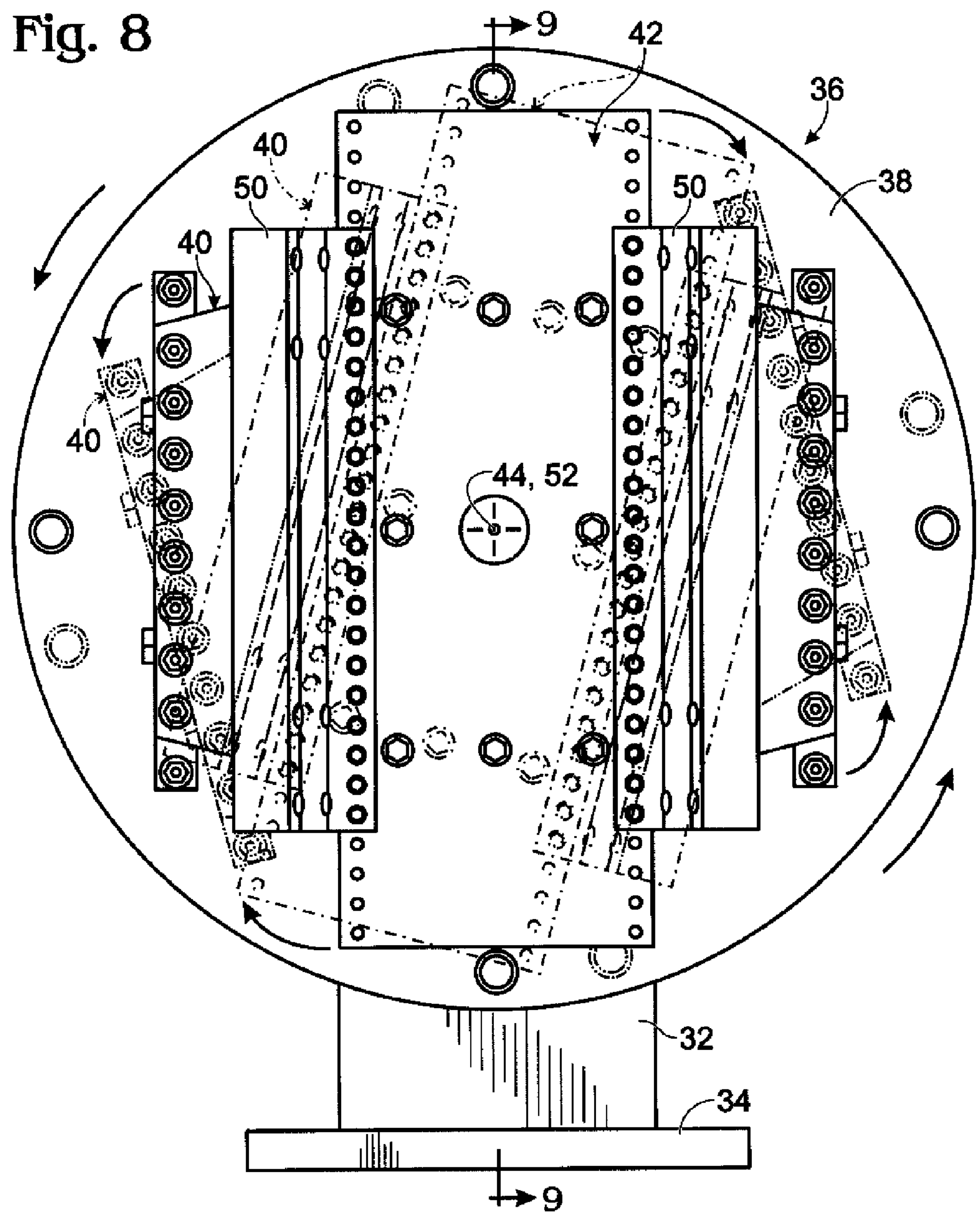

FIG. 8 provides an axial view along rotator axis 44 looking essentially at that face of articulation structure 36 which faces the end of a beam 20 placed in jig structure 24 for handling. In solid lines in this figure, rocker 40 and gripper 42 are shown in what may be thought of as being "nominally unrotated" dispositions, with elongate gripper structures 50—female bearing-surface elements which are provided to receive the male bearing-surface portions in the particular type of beam-end component 20 specifically shown in FIGS. 1-3, inclusive—disposed substantially vertical in conditions ready to receive, by gravity lowering, a beam end component 22 of the type temporarily spring-clipped to the end of a beam 20 in preparation for ultimate angular adjustment and welding to the beam end.

In dash-dot lines in FIG. 8, gripper structure 42 is shown rotated slightly clockwise relative to its solid-outline position in FIG. 8.

In dash-double-dot lines in FIG. 8, rocker structure 40 is shown rotated slightly counterclockwise relative to its solid-outline position in FIG. 8.

With respect to the disposition of components specifically illustrated in FIG. 8, the rocker structure and the gripper structure are pictured essentially in the same solid-outline positions shown for these structures in the schematic, side-view illustration provided in FIG. 5. Under these circumstances, rocker-rotation axis 52 is coincident with rotator axis 44.

Figure 9:
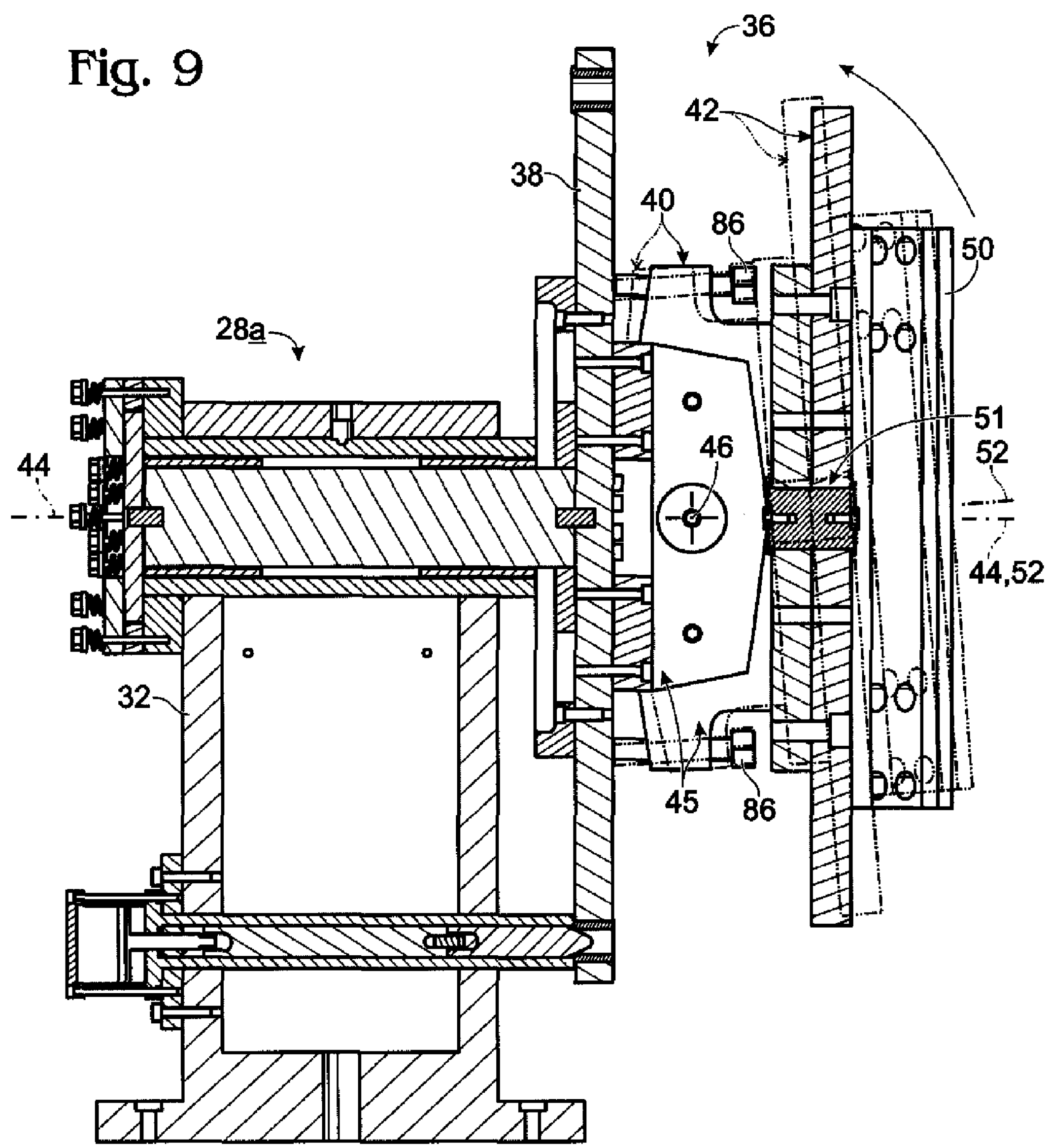

FIG. 9 is essentially a cross-sectional view taken generally along the line 9-9 in FIG. 8. Here, too, the various components in articulation structure 36 are labeled in the same fashion as they are in schematic FIG. 5.

In solid lines in FIG. 9, the rotator, the rocker and the gripper in articulation structure 36 are shown in precisely the same solid-outline positions in which they are pictured in FIG. 5. Under these circumstances, rotator axis 44 and rocker-rotation axis 52 are coincident, and this is indicated by a shared dash-dot line which appears at the right side of FIG. 9. In dash-double-dot lines, the rocker structure—carrying gripper 42—is shown in a slightly counterclockwise-rocked condition about axis 46. Dash-double-dot lines are also companionly employed here to illustrate the "following and connected" rotation of attached gripper 42.

One will note that the rocker structure includes a pair of components, each labeled by a curved arrow extending from reference numeral 45 in FIG. 9, and it will be obvious to those skilled in the art that the two, illustrated, basic rocker components which rock relative to one another in the rocker structure, as attached to the right-hand side of rotator 38, are formed with slightly angulated upper and lower shoulders as seen in FIG. 9, which shoulders provide ultimate rocking range limits for the rocker structure. As was mentioned earlier, the rocking-range permitted rocker 40 is about ±8°. Manually adjustable screws, such as those shown generally at 86 in FIG. 9, may be adjusted to set the rocker angle, and to affix that angle for a particular welding operation through tightening of bolts 86 against the right-hand face of rotator 38 in FIG. 9.

Turning attention finally to FIGS. 10 and 11, here, and as was mentioned earlier, certain details of a specific yoke structure 28*c* are made evident. In particular, a beam 20 is shown in a condition received within slave rotor plate slot 80*a*, with crossbars 82, 84 which carry a plurality of screw-adjustable, quite evident clamping devices, locking an illustrated beam 20 in a condition with its central flange substantially lying in a plane paralleling the long axis of slot 80*a*, and with beam axis 20*a*, as illustrated especially in FIG. 10, shown in coincident alignment with rotator axis 44.

In FIG. 10, a slight clockwise rotation of plate 80 is shown in dash-double-dot lines to reflect rotation which occurs when, during a welding operation, motor-driven rotator 38 turns on axis 44.

There has now thus been described a unique, articulated jig structure which may be employed to aid in manual or computer-based weld-attachment of beam-end components in different, specially angulated conditions, to opposite ends of an I-beam, all for the purposes stated above herein. Adjustments to produce angular dispositions required to deal with vertical and/or horizontal frame-column and beam offsets as described, are performed in structure 24 manually, although it is entirely possible, and those skilled in the art will recognize this, that these adjustments may in fact be computer-controlled adjustments, performed by the influence of appropriately computer-driven motor structures which are engaged with the moveable components in the articulation structures. The adjustments which are possible within the angular adjustment range of ±8° described herein for representational purposes, are infinite in nature within that range. Accordingly, essentially any offset condition which will require an angular adjustment within the stated range, may be made readily utilizing jig structure 24.

As has been stated several times heretofore, it should be understood that a jig structure having all of the features of jig structure 24 may be constructed to accommodate various different kinds of elongate beams, and various kinds of beam-end, column-interface components. Accordingly, the specific details which relate to these particular nodal connection hardware pieces, as illustrated in FIGS. 7-11, inclusive, are only presented herein for the purpose of illustrating one very specific way in which jig structure 24 has been constructed to deal with a certain style of building frame hardware.

Accordingly, while a preferred and best-mode embodiment of the invention, and manner of utilizing that embodiment, have been illustrated and described herein, and certain variations and modifications suggested, it is appreciated that other variations and modifications may be made without departing from the spirit of the invention.

I claim:

1. Jig structure for assisting with the securing, as by manual, or computer-controlled robotic, welding, of a beam-end column-interface component which possesses a nominal plane to the end of an elongate beam having a long axis, said jig structure comprising:

an elongate frame having opposite ends; and beam-support structure carried on said frame adjacent one of the frame's ends for supporting a beam in a condition with the beam's long axis disposed generally in a horizontal condition, said beam-support structure accommodating both lateral translation and angulation of a supported beam as evidenced by spatial repositioning of its long axis, and longitudinal rotation of such a beam generally about its long axis, said beam-support structure including a rotator constructed for enabled, reversible, rotation relative to the frame about a generally horizontal rotator axis, a rocker pivoted on said rotator for limited-angle, reversible, relative-motion, angular rocking about a rocker axis which orthogonally intersects said rotator axis, and a beam-end-component gripper mounted on said rocker for enabled, reversible, rotation about a rocker-rotation axis which orthogonally intersects said rocker axis at the point where rocker axis intersects said rotator axis, said gripper being configured to receive and grip such a beam-end column-interface component in contact juxtaposition relative to the end of a beam supported by said beam-support structure, said rocker-rotation axis being disposed generally normal to a nominal plane of a gripper-gripped, beam-end component.

2. The jig structure of claim 1, wherein said rotator, rocker and gripper are carried on a common, moveable sled which is selectively position-adjustable on and along at least a portion of the length of said frame.

3. The jig structure of claim 1 which further comprises a computer-controllable, articulated, plural-axis, robotic welder effectively carried on said frame adjacent said rotator, functional to weld a beam-end column-interface component to the end of a beam supported by said beam-support structure.

4. The jig structure of claim 3, wherein said rotator, rocker, gripper and welder are carried on a common, moveable sled which is selectively position-adjustable on and along at least a portion of the length of said frame.

5. Computer-assisted, robotic-weld jig structure for attaching, in infinite, angularly differentiated dispositions, beam-end column-interface components to the opposite ends of appropriately supported, elongate beams, said jig structure, for each end of such a beam, comprising a rotator rotatably defining an elongate, common, jig-rotation axis, a rocker pivoted on said rotator for rocking about a rocker axis which orthogonally intersects said jig-rotation axis, a beam-end column-interface-component gripper mounted on said rocker for rotation about a rocker-rotation axis which orthogonally intersects said rocker axis at the point where rocker axis intersects said jig-rotation axis, and a computer-controllable, articulated, plural-axis robotic welder disposed operationally adjacent said rotator.

* * * * *